United States Patent
Noguchi et al.

(10) Patent No.: US 8,902,141 B2
(45) Date of Patent: Dec. 2, 2014

(54) DISPLAY APPARATUS AND DRIVING METHOD

(75) Inventors: Koji Noguchi, Kanagawa (JP);
 Yasuyuki Matsui, Kanagawa (JP);
 Masaaki Kabe, Kanagawa (JP); Akira Sakaigawa, Kanagawa (JP)

(73) Assignee: Japan Display, Inc., Chita (JP)

( * ) Notice: Subject to any disclaimer, the term of this patent is extended or adjusted under 35 U.S.C. 154(b) by 1043 days.

(21) Appl. No.: 12/487,420

(22) Filed: Jun. 18, 2009

(65) Prior Publication Data
 US 2010/0013803 A1    Jan. 21, 2010

(30) Foreign Application Priority Data
 Jul. 18, 2008  (JP) ................................. 2008-187556

(51) Int. Cl.
 *G09G 3/36* (2006.01)
 *G02F 1/1362* (2006.01)
(52) U.S. Cl.
 CPC ........ *G02F 1/136286* (2013.01); *G09G 3/3607* (2013.01); *G09G 3/3648* (2013.01); *G09G 2300/0426* (2013.01)
 USPC ............... 345/88; 345/204; 345/99; 345/100; 257/72; 257/40; 257/79
(58) Field of Classification Search
 USPC ............. 345/88, 204, 99–100; 257/72, 40, 79
 See application file for complete search history.

(56) References Cited

U.S. PATENT DOCUMENTS

| 2002/0005923 | A1* | 1/2002 | Satou ............................ 349/106 |
| 2006/0066535 | A1* | 3/2006 | Shirasaki et al. ............... 345/76 |
| 2007/0002226 | A1* | 1/2007 | Sakamoto et al. ............ 349/114 |

FOREIGN PATENT DOCUMENTS

| JP | 04-130395 | 5/1992 |
| JP | 08-160468 | 6/1996 |
| JP | 2001-033757 | 2/2001 |
| JP | 2006-106062 | 4/2006 |
| JP | 2007-052433 | 3/2007 |
| JP | 2007-334317 | 12/2007 |
| JP | 2009-175468 | 8/2009 |

\* cited by examiner

*Primary Examiner* — Shaheda Abdin
(74) *Attorney, Agent, or Firm* — Robert J. Depke; The Chicago Technology Law Group, LLC

(57) ABSTRACT

Disclosed herein is a display apparatus, including: a display pixel section including a plurality of pixels each including a plurality of subpixels arrayed in a two-dimensional lattice pattern; a plurality of pixel switches for individually driving the plural subpixels; and a plurality of scanning lines to each of which a pair of pixel switch groups each including a series of ones of the pixel switches arrayed along one of the two-dimensional directions of the pixel switches are connected; the pair of pixel switch groups being arranged in an opposing relationship to each other with the scanning line interposed.

12 Claims, 9 Drawing Sheets

DISPLAY APPARATUS AND DRIVING METHOD

The present application contains subject matter related to that disclosed in the Japanese Patent Application JP 2008-187556 filed with the Japan Patent Office on Jul. 18, 2008, the entire content of which is hereby incorporated by reference.

BACKGROUND OF THE INVENTION

1. Field of the Invention

This invention relates to a display apparatus such as a liquid crystal display apparatus and a driving method for a display apparatus.

2. Description of the Related Art

In the past, a display apparatus such as a liquid crystal display apparatus is known. A display apparatus of the type described is used widely in electronic apparatus such as a notebook type personal computer, a portable telephone set and a television receiver.

Incidentally, although various techniques for a display apparatus are known, for example, Japanese Patent No. 3,167,026 discloses a technique of adding W (White) to the three primary colors of R (Red), G (Green) and B (Blue) and suppressing the four display signals to a level lower than a maximum light generation amount of each pixel to expand the saturation allowance up to a maximum light generation amount of each pixel with respect to an input signal thereby to expand the dynamic range of the luminance.

In such an existing display apparatus such as a liquid crystal display apparatus as just described, increase of the definition of a display element advances to enhance the picture quality together with the progress of the technique.

SUMMARY OF THE INVENTION

However, in an existing display apparatus, together with increase of the definition, the power for displaying an image is increasing. One of the causes is increase of the display clock arising from increase of the number of scanning lines and signal lines for displaying an image.

In a liquid crystal display apparatus, a plurality of scanning lines and a plurality of signal lines are formed regularly in horizontal and vertical directions on one of two transparent substrates arranged in an opposing relationship to each other. Further, a pixel switch such as a TFT for driving a display element is formed in each of display regions defined by the scanning lines and the signal lines.

Usually, the display elements are driven by line scanning driving. Each scanning line carries out turning on/off of the pixel switches, and each signal line inputs a signal necessary for image display to the signal line which is turned on. Consequently, the display resolution, for example, where a display apparatus of the aspect ratio of 4:3 displays an image in accordance with the VGA (Video Graphic Array), is 480×640 pixels. Therefore, if it is taken into consideration that the frame frequency is 60 Hz, then the time required for writing from a signal line per one scanning line is approximately 35 μs.

However, the writing time from a signal line relies upon the number of scanning lines, and if the number of scanning lines increases, then the writing time must be reduced as much. Although enhancement of the resolution in the horizontal direction is achieved only by increase of the number of signal lines for writing and does not give an influence on the writing time, increase of the resolution or increase of the frame frequency such as 120-Hz driving inevitably reduces the writing time of signal lines. Therefore, this gives rises to subjects to be solved 1) that a pixel potential cannot be written sufficiently and 2) that, together with increase of the driving frequency, the power consumption of a drive circuit increases greatly.

Therefore, it is desirable to provide a display apparatus and a driving method for a display apparatus wherein, even if the resolution increases or the frame frequency increases, writing from a signal line can be carried out with a sufficiently high pixel potential while increase of the power consumption can be prevented.

According to an embodiment of the present invention, there is provided a display apparatus, including a display pixel section, a plurality of pixel switches, and a plurality of scanning lines. The display pixel section includes a plurality of pixels each including a plurality of subpixels arrayed in a two-dimensional lattice pattern. The plurality of pixel switches individually drive the plural subpixels. The plurality of scanning lines to each of which a pair of pixel switch groups each include a series of ones of the pixel switches arrayed along one of the two-dimensional directions of the pixel switches are connected. The pair of pixel switch groups are arranged in an opposing relationship to each other with the scanning line interposed.

In the display apparatus, since the pixel switch groups are disposed in an opposing relationship to each other with the scanning line interposed, the number of scanning lines is reduced.

According to another embodiment of the present invention, there is provided a display apparatus, including a display pixel section, a plurality of pixel switches, and a plurality of scanning lines. The display pixel section includes a plurality of pixels each including a plurality of subpixels arrayed in a two-dimensional matrix in a scanning line direction and a signal line direction. The plurality of pixel switches individually drive the sub pixels. The plurality of scanning lines to each of which a pair of pixel switch groups each include a series of ones of the pixel switches arrayed along one of the two-dimensional directions of the pixel switches are connected. The scanning lines are sampled out with respect to the number of pixels in the scanning line direction.

In the display apparatus, the number of scanning lines is reduced.

According to a further embodiment of the present invention, there is provided a driving method for a display apparatus, including the step of driving those of a plurality of pixel switches, which are arrayed along one of two-dimensional directions and arranged in an opposing relationship to each other with a scanning line interposed between and are connected to the scanning line, using the scanning line.

In the driving method for a display apparatus, the pixel switches are controlled between on and off by a reduced number of scanning lines.

With the display apparatus and the driving method for a display apparatus, even if increase of the resolution or increase of the frame frequency occurs, writing from a signal line with a sufficiently high pixel potential can be carried out and increase of the power consumption can be prevented.

DETAILED DESCRIPTION OF THE PREFERRED EMBODIMENTS

In the following, preferred embodiments of the present invention are described in detail with reference to the accompanying drawings.

In the embodiments of the present invention, a display apparatus is characterized in that, in a structure wherein writing is carried out in an upward and downward direction with respect to a scanning line for selecting switching elements in a pixel array of a display element, a number of scanning lines are removed or sampled out with respect to the number of pixels in the direction of a scanning line. The distance of such removal may be, for example, every other line. Further, signal lines may be arrayed in an equally spaced relationship from each other.

Now, the embodiments of the present invention are described individually.

(First Embodiment)

Figure 1:
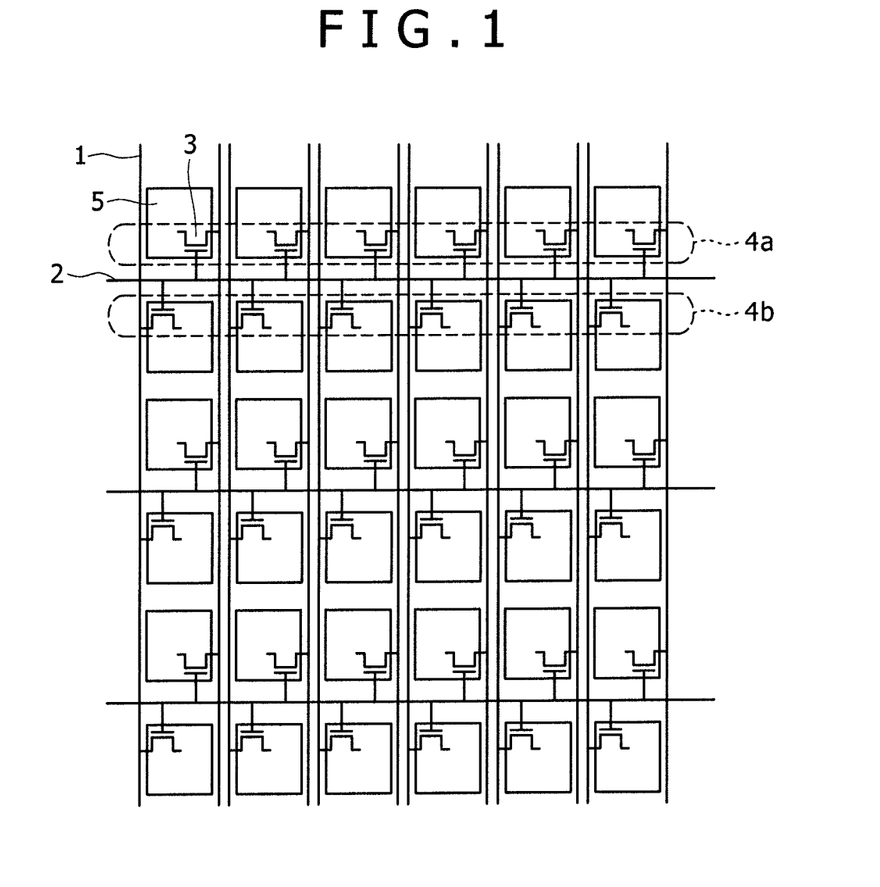
FIG. 1 is a schematic view showing a display pixel section for displaying an image of a liquid crystal apparatus as a display apparatus according to a first embodiment of the present invention.

FIG. 1 shows a display pixel section for displaying an image of a liquid crystal apparatus as a display apparatus according to a first embodiment of the present invention.

Referring to FIG. 1, the liquid crystal display apparatus is generally configured such that a plurality of signal lines 1 are arrayed so as to extend in a vertical direction while a plurality of linear scanning lines 2 are arrayed so as to extend in a horizontal direction perpendicular to the direction of the signal lines 1. A plurality of TFTs 3 are arranged such that those of the TFTs 3 which are arrayed along the horizontal direction along and connected to a scanning line 2 form a pair of pixel switch groups 4a and 4b which are opposed to each other with the scanning line 2 sandwiched therebetween. In other words, each two pixel switch groups 4a and 4b disposed in an opposing relationship to each other in the vertical direction across the scanning line 2 are connected to the same scanning line 2.

A subpixel 5 is formed in each of regions defined by the signal lines 1 and the scanning lines 2, and a TFT 3 is formed in each of the subpixels 5.

Figure 2:
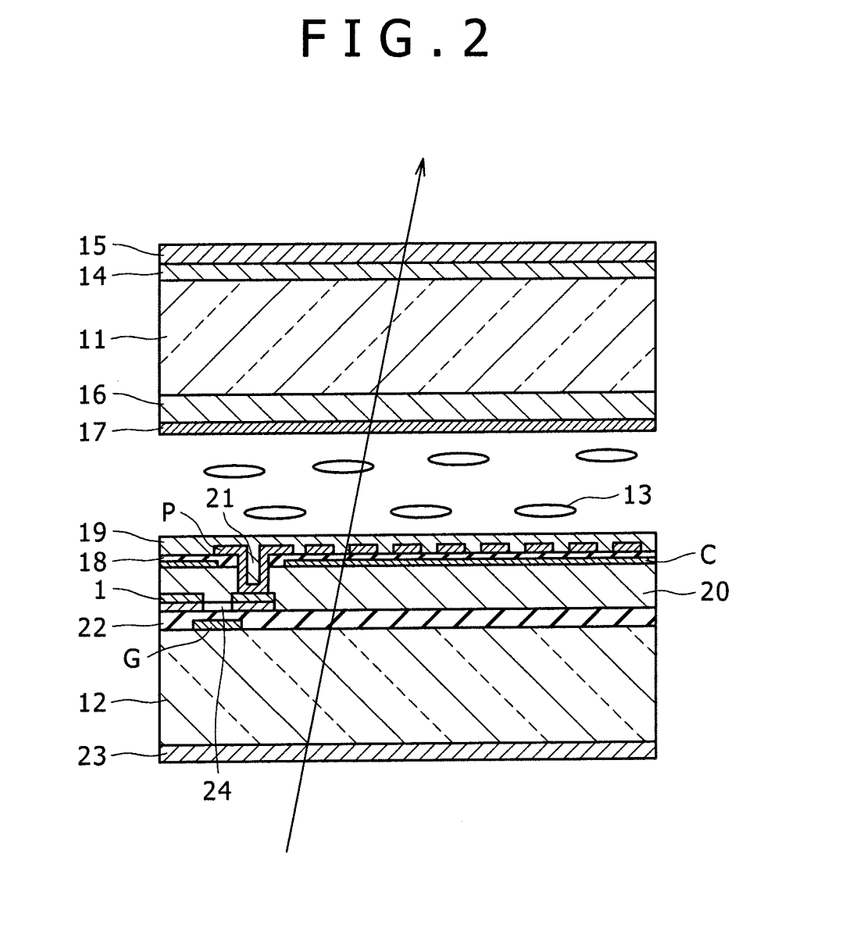
FIG. 2 is a cross sectional view of the liquid crystal apparatus of FIG. 1.

FIG. 2 shows a sectional structure of the liquid crystal display apparatus of FIG. 1.

Referring to FIG. 2, the liquid crystal display apparatus shown includes an upper transparent substrate 11, a lower transparent substrate 12 disposed in an opposing relationship to the upper transparent substrate 11, a liquid crystal layer 13 held between the upper transparent substrate 11 and the lower transparent substrate 12 and having liquid crystal molecules therein, a polarizing plate 15 fixed to the outer side of the upper transparent substrate 11 by an adhesive 14, and a polarizing plate 23 arranged on the outer side of the lower transparent substrate 12. Further, though not shown, a backlight is arranged adjacent the polarizing plate 23. A color filter 16 is formed on the upper transparent substrate 11 adjacent the lower transparent substrate 12, and an orientation film 17 for controlling the orientation direction of the liquid crystal molecules in the liquid crystal layer 13 is formed on the color filter 16 adjacent the lower transparent substrate 12.

Meanwhile, a switching element 20 as a pixel switch is formed on the lower transparent substrate 12. A gate electrode G is formed on the lower transparent substrate 12 adjacent the upper transparent substrate 11, and a gate insulating film 22 made of, for example, silicon dioxide is formed so as to cover the gate electrode G. A TFT 24 as a pixel switch is formed on the gate insulating film 22, and a linear signal line 1 is connected to the TFT 24. A flattening layer 20 is formed on the gate insulating film 22, and a contact hole 21 is formed in the flattening layer 20.

A common electrode C is formed on the flattening layer 20 adjacent the upper transparent substrate 11, and a pixel electrode P is formed on the common electrode C with an interlayer insulating film 18 interposed therebetween. The pixel electrode P is formed so as to extend into the inside of the contact hole 21 and connected to the TFT 24. Further, an orientation film 19 is formed on the surface of the flattening layer 20 in such a manner as to cover the pixel electrode P.

The pixel electrode P is formed, for example, from a reflecting electrode material such as aluminum, a transparent electrode material such as ITO (Indium Tin Oxide), or an organic transparent conductive material by AGFA. For example, if the pixel electrode P is formed from a reflecting electrode material, then the region of the pixel electrode P forms a reflection portion while the other area forms a transmission portion. If the TFT 24 is placed into an on state, then a voltage corresponding to a desired image is supplied to the pixel electrode P.

The common electrode C may be formed from a reflecting electrode material or from a transparent electrode material such as ITO or an organic transparent conductive material by AGFA. Where an organic transparent conductive material is adopted, reduction of the cost can be anticipated in comparison with an alternative case wherein ITO or the like is adopted. It is to be noted that, where the common electrode C is formed from a reflecting electrode material, the region of the common electrode C forms a reflection portion, whereas the common electrode C is formed from a transparent electrode material, the region of the common electrode C forms a transmission portion. The common electrode C formed on the lower transparent substrate 12 is fixed to a common potential.

Figure 3:
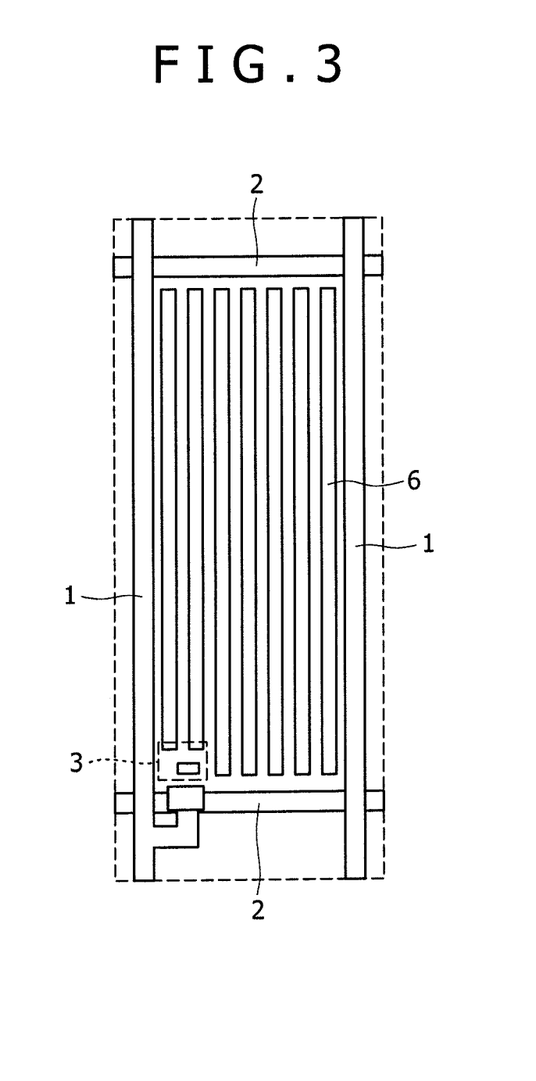
FIG. 3 is a top plan view of a subpixel of the liquid crystal apparatus of FIG. 1.

FIG. 3 shows a subpixel of the liquid crystal apparatus of FIGS. 1 and 2.

Referring to FIG. 3, a pair of signal lines 1 extend in the vertical direction on the opposite sides of each subpixel, and a pair of scanning lines 2 extend in the horizontal direction in an intersecting relationship with the signal lines 1. A TFT 3 is connected to one of the scanning lines 2. A pixel electrode 6 is arranged on an opening face.

Figure 4:
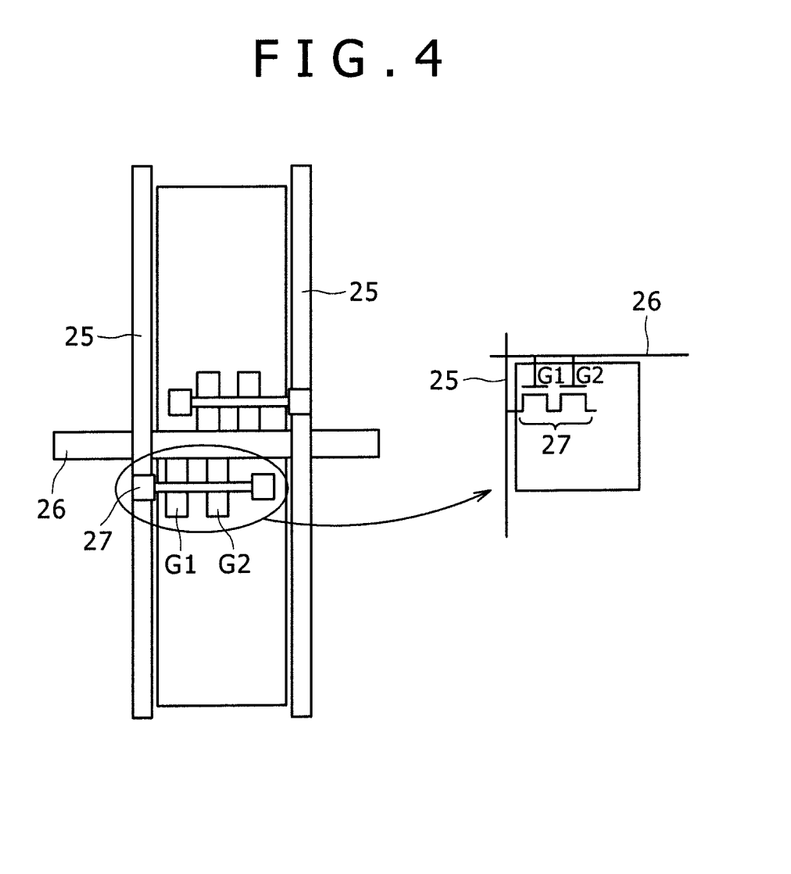
FIG. 4 is a schematic view showing a double-gate structure.

It is to be noted that, for the stabilization in fabrication, it is possible to adopt a double gate structure for the subpixel as seen in FIG. 4. In particular, gate electrodes G1 and G2 of two TFTs of TFT sections 27 may naturally be connected to a signal line 25 and a scanning line 26 which intersect with each other as seen in FIG. 4.

Now, an array of pixels is described.

Figure 5A:
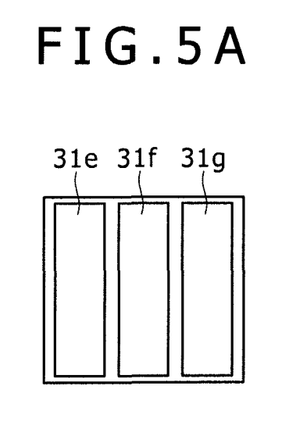
FIGS. 5A to 5C are schematic views illustrating different arrays of pixels.

FIG. 5A shows an example of an array of pixels. Referring to FIG. 5A, a pixel is composed of subpixels 31e, 31f and 31g which emit light of the three primary colors of R, G and B. The subpixels 31e, 31f and 31g are arranged between adjacent ones of the scanning lines 2 such that the colors of light emitted from those ones of the subpixels 31e, 31f and 31g which are positioned adjacent each other in the direction along a scanning line 2 are different from each other. In short, the subpixels are arrayed in a stripe array.

Figure 5B:
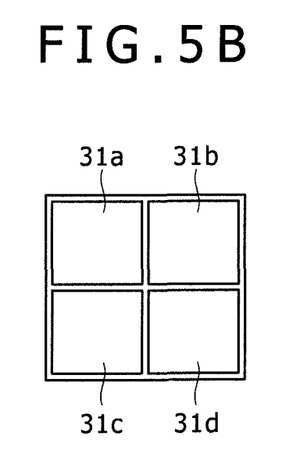

FIG. 5B shows another example of an array of pixels. Referring to FIG. 5B, a pixel is composed of four different subpixels 31a, 31b, 31c and 31d arranged such that adjacent ones thereof in a direction perpendicular to the extending direction of the pixel switch groups 4a and 4b which is an extending direction of a scanning line 2 emit light of different colors. In FIG. 5B, the subpixels 31a and 31c which emit light of R and B are positioned adjacent each other in the vertical direction, and the subpixels 31b and 31d which emit light of G and W (white) are positioned adjacent each other alongside the subpixels 31a and 31c. In short, the subpixels are arrayed in a mosaic array.

Figure 5C:
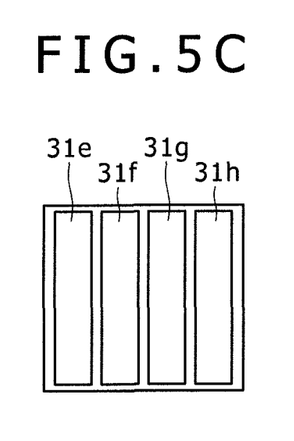

FIG. 5C shows a further example of an array of pixels. Referring to FIG. 5C, a pixel is composed of four subpixels 31e, 31f, 31g and 31h which are elongated in the vertical direction and emit light of four different colors including the three primary colors of R, G and B and white (W). The subpixels 31e, 31f, 31g and 31h are arranged between adjacent ones of the scanning lines 2 such that those ones thereof which are adjacent in the direction along a scanning line 2 emit light of different colors from each other. Also in the array of FIG. 5C, the subpixels are arrayed in a stripe array.

(Second Embodiment)

In the following description of a second embodiment of the present invention, it is assumed that four subpixels of R, G, B and W are arrayed in a mosaic array described above.

Figure 6:
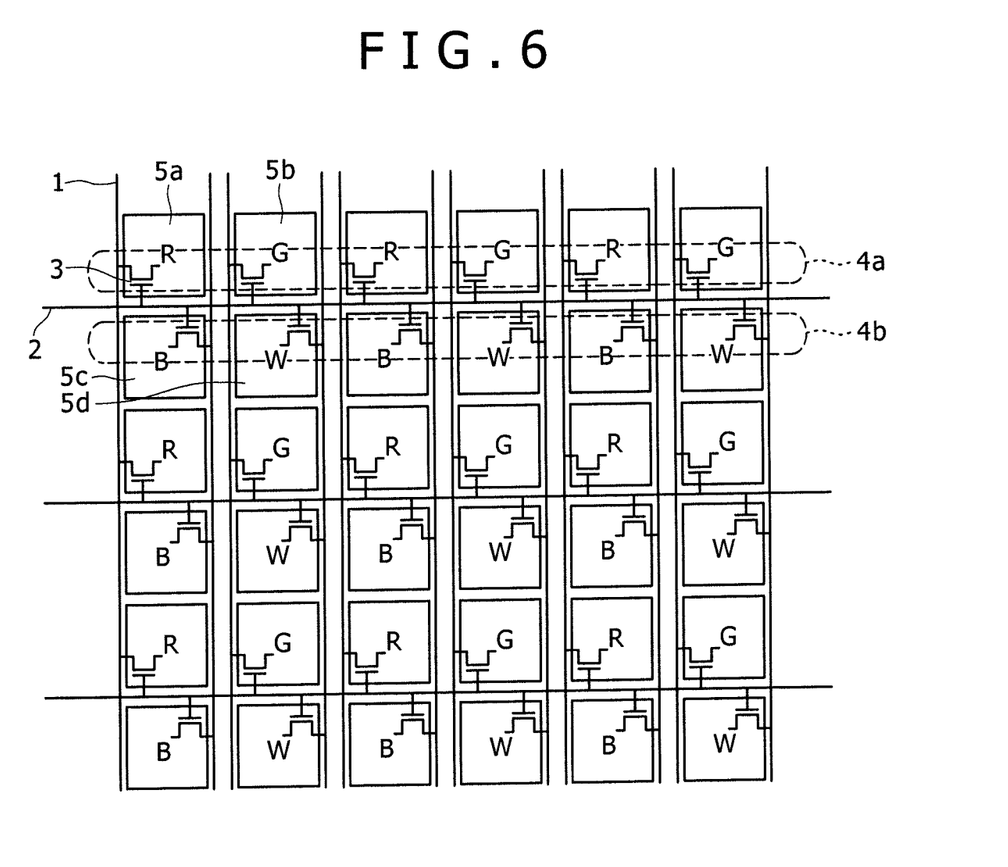
FIG. 6 is a schematic view of a form of a display pixel section for displaying an image of a liquid crystal display apparatus as a display apparatus according to a second embodiment of the present invention.

FIG. 6 shows a form of a display pixel section for displaying an image of a liquid crystal display apparatus as a display apparatus according to a second embodiment of the present invention.

Referring to FIG. 6, a plurality of signal lines 1 described hereinabove are juxtaposed so as to extend in the vertical direction, and a plurality of linear scanning lines 2 are formed so as to extend in the horizontal direction perpendicular to the extending direction of the signal lines 1. A plurality of TFTs 3 are arranged such that those of the TFTs 3 which are arrayed along the horizontal direction along and connected to a scanning line 2 form a pair of pixel switch groups 4a and 4b which are opposed to each other with the scanning line 2 sandwiched therebetween. In other words, each two pixel switch groups 4a and 4b disposed in an opposing relationship to each other in the vertical direction across the scanning line 2 are connected to the same scanning line 2.

A plurality of subpixels 5a, 5b, 5c and 5d are formed in each of regions defined by the signal lines 1 and the scanning lines 2, and a TFT 3 is formed in each of the subpixels 5.

The subpixels include four kinds of subpixels including, in addition to the subpixels 5a, 5b and 5c which emit light of the three primary colors of R, G and B, a subpixel 5d which emits light of W (White) as a fourth light color whose luminance is higher than that of the light of R, G and B. The subpixels 5a, 5b, 5c and 5d have an equal size and are disposed between adjacent ones of the scanning lines 2.

In this manner, in the liquid crystal display apparatus according to the second embodiment, the pixel switch groups 4a and 4b are disposed in an opposing relationship in the vertical direction to each other with the scanning line 2 sandwiched therebetween and connected to the same scanning line 2. Consequently, the number of scanning lines can be reduced to one half that where each of the pixel switch groups 4a and 4b is connected to one scanning line 2. Therefore, the writing time from a signal line 1 allocated to each scanning line can be increased. Accordingly, upon writing from the signal line 1, a signal can be written with a sufficiently high pixel potential. Further, even if the driving frequency is increased, increase of the power consumption of an associated driving circuit can be suppressed.

The present liquid crystal display apparatus is effective particularly where four different subpixels 5a to 5d are used. In the case of the array described hereinabove with reference to FIG. 5C, a minimum value is determined in advance for the line widths of the scanning lines 2 and the signal lines 1, and where a pixel is elongated longitudinally, particularly the signal lines 1 suppress the numerical aperture, which is a ratio at which light passes, there is the possibility that the numerical aperture may be decreased.

In contrast, where the four different subpixels 5a to 5d are arranged in such a manner as illustrated in FIG. 5B, since it is necessary to drive subpixels juxtaposed in the vertical direction separately from each other, originally the number of scanning lines must be increased from that in the case of FIG. 5C. However, in the liquid crystal display apparatus according to the present embodiment, since the pixel switch groups 4a and 4b are arranged in an opposing relationship to each other with a scanning line 2 interposed therebetween and are connected to the scanning line 2, the number of scanning lines can be reduced.

Further, the influence of increase of the number of scanning lines 2 which is caused by the arrangement of the four different subpixels 5a to 5d in such a manner as seen in FIG. 5B is reduced.

Besides, there is no necessity to increase the writing frequency of a signal from the signal lines 1.

Figure 7:
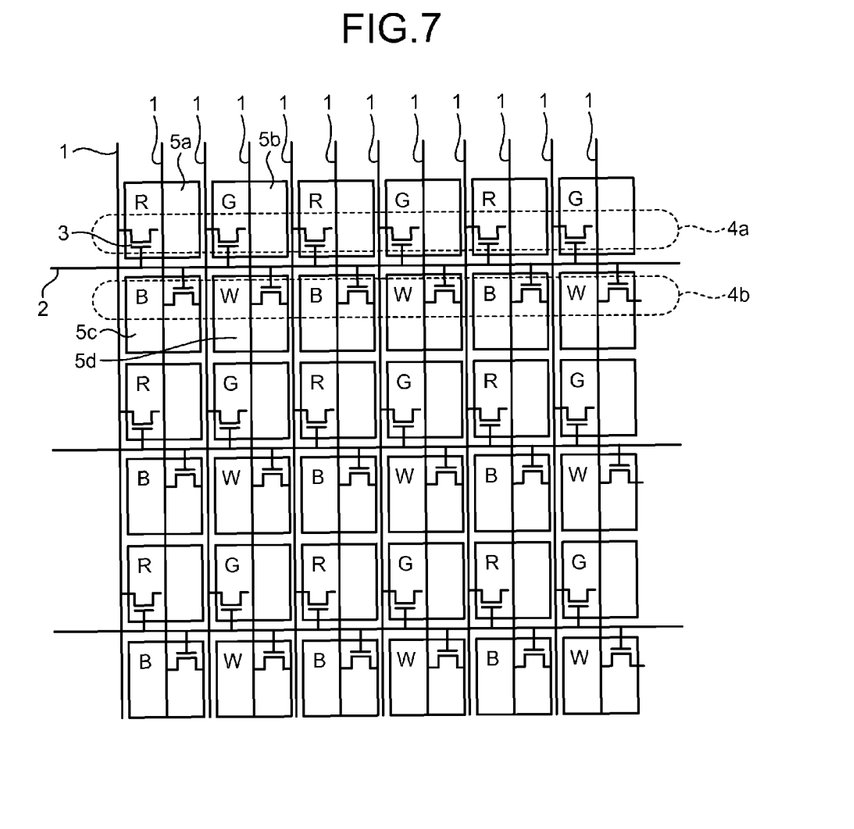
FIG. 7 is a schematic view of another form of the display pixel section of the liquid crystal display apparatus as the display apparatus according to the second embodiment of the present invention.

Meanwhile, in the liquid crystal display apparatus, since the signal lines 1 are arranged in such a manner as to make a detour around the subpixels 5a to 5d, adjacent signal lines 1 are positioned closely to each other. Therefore, there is the possibility that, upon signal writing, noise may be mixed to cause interference. In order to eliminate this, it is naturally possible to arrange the signal lines 1 in an equally spaced relationship from each other along the horizontal direction. More particularly, where two signal lines are arranged at positions near to each other as in the case of FIG. 6 described hereinabove, actually a signal somewhat different from a signal which should be written is sometimes written because of coupling by an electric signal from a neighboring signal line depending upon the writing potential. This is sometimes visualized as periodical stripes or spots. By setting the distances between signal lines equal to each other so as to make such a structure as shown in FIG. 7, the influence of coupling between signal lines can be reduced significantly.

(Third Embodiment)

Now, a third embodiment of the present invention is described.

Figure 8:
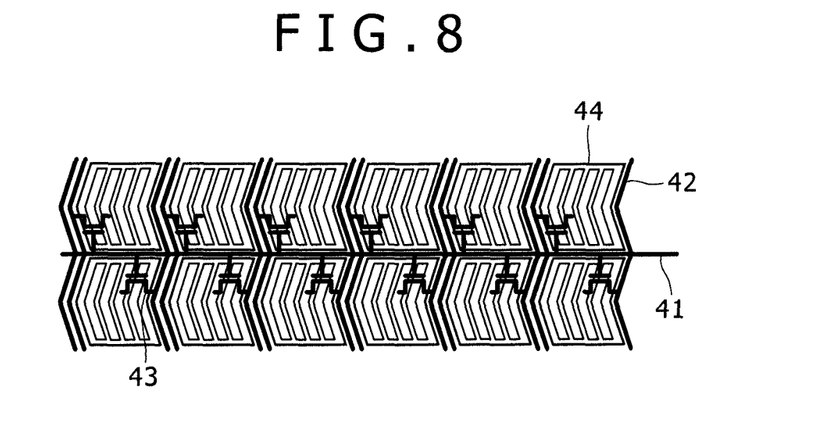
FIG. 8 is a schematic view of a form of a display pixel section of a liquid crystal display apparatus as a display apparatus according to a third embodiment of the present invention.
Figure 9:
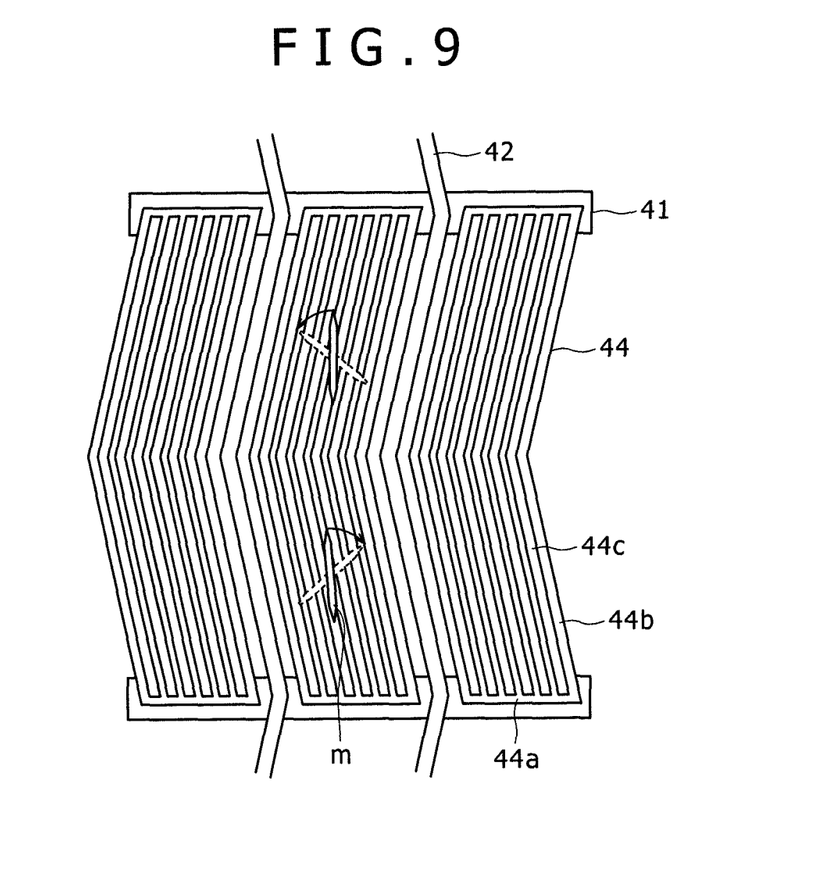
FIG. 9 is an enlarged view of part of the display pixel section of FIG. 8.

FIGS. 8 and 9 show a form of a display pixel section of a liquid crystal display apparatus as a display apparatus according to a third embodiment of the present invention.

Referring to FIG. 8, in the liquid crystal display apparatus shown, although each scanning line 41 is formed linearly, each signal line 42 has a bent structure wherein an intermediate portion thereof positioned between the scanning lines 41 positioned adjacent each other is bent in an L shape. Each pixel electrode 44 is structured such that a plurality of elongated belt-like portions 44b are formed between base portions 44a at which the pixel electrode 44 is connected to the scanning lines 41 and define slits 44c therebetween and intermediate portions of the belt-like portions 44b along the signal lines 42 are bent in an L shape.

The liquid crystal display apparatus can be driven in a transverse electric field mode. In this instance, the pixel electrode 44 and a common electrode not shown are formed in a juxtaposed relationship on a flattening layer not shown. Thus, if a voltage is applied between the pixel electrode 44 and the common electrode, then a transverse electric field substantially parallel to the surface of a lower transparent substrate not shown which is a substrate similar to the lower transparent substrate 12 is generated between the pixel electrode 44 and the common electrode. By the transverse electric field, the direction of the liquid crystal molecules in the liquid crystal layer is controlled within a plane parallel to the surface of the lower transparent substrate. Since the liquid crystal display apparatus is driven in the transverse electric field mode, the color drift by gradations or the variation of the angular field of view by gradations is small, and where W pixels (white) and RGB pixels are displayed in a mixed manner, there is no necessity to take other factors into consideration and very simple display can be anticipated.

Further, where an image is displayed in the transverse electric field mode, it is known to carry out divisional orientation in a pixel to produce directions for rotating liquid crystal molecules in the counterclockwise direction and the clockwise direction (indicated by reference character m in FIG. 9.) In this technique, a region within which liquid crystal cannot rotate appears at a central portion of the rotation. The transmission factor contribution of this portion is very low, and the region makes an invalid region. If a signal line 42 is arranged at this portion, then a structure of a very high efficiency can be obtained.

Figure 10:
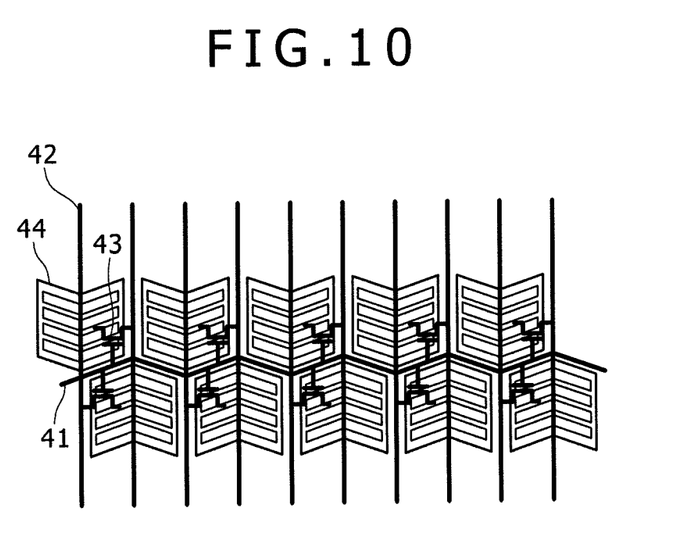
FIG. 10 is a schematic view of another form of the display section of the liquid crystal display apparatus as the display apparatus according to the third embodiment of the present invention.

In the structure shown in FIGS. 8 and 9, since adjacent signal lines 42 are positioned close to each other, the signal lines 42 may be arranged in an equally spaced relationship from each other as shown in FIG. 10. It is to be noted that the direction of the pixel electrodes 44 is shown varied.

As described in detail above, with the embodiments of the present invention, even if increase of the resolution or increase of the frame frequency occurs, writing from a signal line with a sufficiently high pixel potential can be carried out and increase of the power consumption can be prevented.

While the first to third embodiments of the present invention are described above, the present invention is not limited to them, but various improvements and modifications can be made without departing from the subject matter of the present invention.

While it is described above that light emitted from the subpixels has the colors R, G and B or R, G, B and W, it may otherwise have the colors of yellow, cyan and magenta except W.

The present application contains subject matter related to that disclosed in Japanese Priority Patent Application JP 2008-187556 filed with the Japan Patent Office on Jul. 18, 2008, the entire content of which is hereby incorporated by reference.

What is claimed is:

1. A display apparatus, comprising:
a display pixel section including a plurality of pixels having subpixels arrayed in a two-dimensional pattern;
a plurality of subpixel switches for individually driving said plural subpixels;
a plurality of scanning lines that extend in a first direction and to each of which subpixel switch groups are connected, each of the subpixel switch groups including at least one of the subpixels; and
a plurality of signal lines that extend in a second direction and intersect with the scanning lines;
wherein said subpixel switch groups are arranged in an opposing relationship to each other with the scanning line interposed therebetween such that subpixels on opposite sides of each scanning line receive a signal from the scanning line, wherein the subpixels are arranged such that two different colored subpixels of each pixel are located on opposite sides of the scanning line to which the subpixels of the pixel are connected, and all subpixels of each pixel are connected to a corresponding common scanning line, and
wherein signal lines overlapping the subpixels and signal lines not overlapping the subpixels are arranged with equally-spaced intervals.

2. The display apparatus according to claim 1, wherein those of said subpixels which emit light of different colors from each other are arranged along a direction perpendicular to a direction in which the pixel switch groups extend between adjacent ones of said scanning lines.

3. The display apparatus according to claim 1, wherein those of said subpixels which emit light of colors including red, green, blue and a fourth light color whose luminance is higher than that of red, green and blue are arranged between adjacent ones of said scanning lines.

4. The display apparatus according to claim 1, wherein those of said subpixels which emit light of colors including red, green, blue and a fourth light color whose luminance is higher than that of red, green and blue are arranged between adjacent ones of said scanning lines, and those of said subpixels which emit light of different colors from each other are arranged along a direction intersecting with the direction in which the pixel switch groups extend.

5. The display apparatus according to claim 1, further comprising a pixel electrode for carrying out pixel display in said display pixel section, said pixel electrode having a bent structure wherein an intermediate portion in the direction intersecting with the extending direction of said pixel switch groups is bent, said signal lines having a bent structure similar to that of said pixel electrode.

6. The display apparatus according to claim 1, further comprising:
a pixel electrode for carrying out pixel display in said display pixel section; and
a common electrode formed in a juxtaposed relationship with the pixel electrode;
said display apparatus operating in a transverse electric field mode wherein an electric field in a transverse direction along a direction in which said pixel switch groups extend is generated between said pixel electrode and said common electrode.

7. The driving method for a display apparatus according to claim 1, wherein the signal lines not overlapping the pixels provide signals for pixels at a first side of each of the scanning lines and the signal lines overlapping the pixels provide signals for pixels at a second side of the scanning lines that is opposite the first side.

8. A display apparatus, comprising:
a display pixel section including a plurality of subpixels arrayed in a two-dimensional matrix;

a plurality of subpixel switches for individually driving said subpixels; and a plurality of scanning lines to each of which pixel switch groups including at least one of the subpixels are connected in an opposing relationship to each other with the scanning line interposed therebetween such that subpixels on opposite sides of each scanning line receive a signal from the scanning line, wherein the subpixels are arranged such that two different colored subpixels of each pixel are located on opposite sides of the scanning line to which the subpixels of the pixel are connected, and all subpixels of each pixel are connected to a corresponding common scanning line, and wherein signal lines overlapping the subpixels and signal lines not overlapping the subpixels are arranged with equally-spaced intervals.

9. The display apparatus according to claim 8, wherein said scanning lines are sampled out for every other line.

10. The display apparatus according to claim 8, wherein the signal lines not overlapping the pixels provide signals for pixels at a first side of each of the scanning lines and the signal lines overlapping the pixels provide signals for pixels at a second side of the scanning lines that is opposite the first side.

11. A driving method for a display apparatus, comprising:
driving a plurality of subpixel switches arranged in an opposing relationship to each other with a scanning line interposed between such that subpixels on opposite sides of the scanning line each receive a signal from the scanning line, the scanning lines extending in a first direction, the subpixels being arranged such that two different colored subpixels of each pixel are located on opposite sides of the scanning line to which the subpixels of the pixel are connected, all subpixels of each pixel being connected to a corresponding common scanning line ; and supplying display signals to the subpixels through a plurality of signal lines that extend in a second direction and intersect with the scanning lines;

wherein signal lines overlapping the subpixels and signal lines not overlapping the subpixels are arranged with equally-spaced intervals.

12. The display apparatus according to claim 11, wherein the signal lines not overlapping the pixels provide signals for pixels at a first side of each of the scanning lines and the signal lines overlapping the pixels provide signals for pixels at a second side of the scanning lines that is opposite the first side.

* * * * *